United States Patent [19]
Kaneko

[11] Patent Number: 5,863,167
[45] Date of Patent: Jan. 26, 1999

[54] DRILLING SCREW FOR FIXING GYPSUM BOARD TO THIN STEEL PLATE

[75] Inventor: Yoshihiro Kaneko, Tokyo, Japan

[73] Assignee: Max Co.,Ltd, Japan

[21] Appl. No.: 695,574

[22] Filed: Aug. 12, 1996

[30] Foreign Application Priority Data

Aug. 22, 1995 [JP] Japan ................................ 7-213780

[51] Int. Cl.$^6$ ............................ F16B 35/04; F16B 33/00
[52] U.S. Cl. ............................ 411/426; 411/412; 411/386
[58] Field of Search ..................................... 411/411, 412, 411/426, 386, 387

[56] References Cited

U.S. PATENT DOCUMENTS

| | | | |
|---|---|---|---|
| 288,798 | 11/1883 | Harvey | 411/386 |
| 413,968 | 10/1889 | Rogers | 411/386 |
| 1,827,615 | 10/1931 | Rosenberg | 411/386 |
| 1,980,093 | 11/1934 | Rosenberg | 411/412 |
| 3,208,328 | 9/1965 | Myers | 411/386 |
| 3,942,405 | 3/1976 | Wagner | 411/386 |
| 4,653,244 | 3/1987 | Ferrell | 411/412 |

FOREIGN PATENT DOCUMENTS

| | | | |
|---|---|---|---|
| 2853976 | 6/1980 | Germany | 411/387 |

*Primary Examiner*—Flemming Saether
*Attorney, Agent, or Firm*—Fattibene & Fattibene; Paul A. Fattibene; Arthur T. Fattibene

[57] ABSTRACT

The present invention supplies a drilling screw which can fix a gypsum board to a thin steel plate by utilizing an impact-type air driven screw fastener and execution method for fixing efficiently the gypsum board to the thin steel plate. The drilling screw 11 comprising the parallel thread part 13 and the smaller diameter parallel thread part 15 which are connected through the taper thread part 14. The height of thread crest of the smaller diameter parallel thread part 15 is as small as about 0.1 mm. The taper bit 16 is formed at the fore end of the smaller diameter parallel thread part 15. When the drilling screw 11 is hammered into the gypsum board and the C-type steel plate structural material with the impact-type air driven screw fastener, the smaller diameter parallel thread part 15 is inserted through the steel plate. Since the smaller diameter parallel thread part 15 has so small diameter, the steel plate is seldom deformed. The small-sized thread crest provided at the smaller parallel thread part 15 generates driving force in the inserting direction of the screw upon its rotation so that the parallel thread part 13 is screwed into the steel plate, resulting in fixation of the gypsum board and the C-type steel plate structural material.

3 Claims, 5 Drawing Sheets

DRILLING SCREW FOR FIXING GYPSUM BOARD TO THIN STEEL PLATE

Field of the Invention

This invention relates to a drilling screw and execution method for fixing a gypsum board to a thin steel plate by utilizing this drilling screw.

Background of the Invention

An impact-type air driven screw fastener, by whose driver the screw is put into to some degree and rotated to be fastened, can improve greatly the efficiency of screw fastening comparing with a motor driver which is activated by only rotation.

However, when a gypsum board is fixed to a C-type steel plate structural material which is molded from a steel plate of 0.5 mm or 0.8 mm thick and commonly named as 'Keiten (Japanese)', if a drilling screw for a steel plate is fastened by utilizing the impact-type air driven screw fastener, the following problems are caused; a screw fastened previously is loosened or buried into the gypsum board by the impact of hammering of the screw fastened next. Particularly, as shown in FIG. 4, when two sheets of gypsum board 2, 3 are set so as to butt against each other on the C-type steel plate structural material 1 and the screws 4, 5 are fastened to the gypsum boards 2, 3, respectively, the following problems are caused due to the small thickness of the C-type steel plate structural material 1; as shown in the same figure, deformation and vibration of the C-type steel plate structural material 1 are caused by the impact of hammering, thereby the screw 4 fastened previously may be buried into the gypsum board 2 and the coating paper 6 of the gypsum board 2 may be broken so that the load strength of the gypsum board 2 is decreased, alternately, as shown in FIG. 5, a thread crest 7 provided at the place, where the screw 4 fastened previously is fitted into the C-type steel plate structural material 1, may be deformed or damaged so that the fastening force may be decreased, resulting in loose of screw 4. Therefore, in order to fasten the gypsum board to the C-type steel slate structural material, a commonly used fastener is not the impact-type air driven screw fastener, but the motor driver which is activated with only rotation.

On the other hand, high efficiency has been required in fastening the gypsum board to the metal steel such as C-type steel plate structural material. The decrease of load strength and fastening power would be caused by deformation of the steel plate due to hammering of screws into the gypsum board and the C-type steel plate structural material. Accordingly, in order to improve efficiency in the fastening, screw fastening with the impact-type air driven screw fastener must be facilitated in the situation decrease of load strength and fastening power is eliminated. In such situation, there is a technical problem to be solved. The object of the present invention thereby is to solve this problem.

Summary of the Invention

The present invention is proposed for attaining the above object by supplying a drilling screw comprising a parallel thread part which has a trumpet head at its one end; a taper thread part; a smaller diameter parallel thread part, which has a taper bit at its fore end and is connected to the parallel thread part through a taper thread part; and a thread crest, which passes from the parallel thread part to the smaller diameter parallel thread part and has a decreased height at the above smaller diameter parallel thread part. Then, when the drilling screw is hammered into a steel plate and the like with an impact-type air driven screw fastener, the sharp taper bit can be inserted through the steel plate and the like with small resistance. Further, since the parallel thread part located at the hammered screw's fore end is formed so as to have the small diameter, deformation and vibration of the steel plate and the like are decreased. Due to the small-sized thread crest of the smaller diameter parallel thread part, driving force is generated in the screw's inserting direction upon its rotation, further, the screw can be inserted through with resistance which is not substantially increased. Therefore, even if strong pressure is not applied to the impact-type screw in the inserting direction, the drilling screw can be driven without idle, further, a tapping hole formed on the gypsum board is prevented from damage so that the gypsum board can be fixed to the thin steel plate efficiently.

Figure 1:
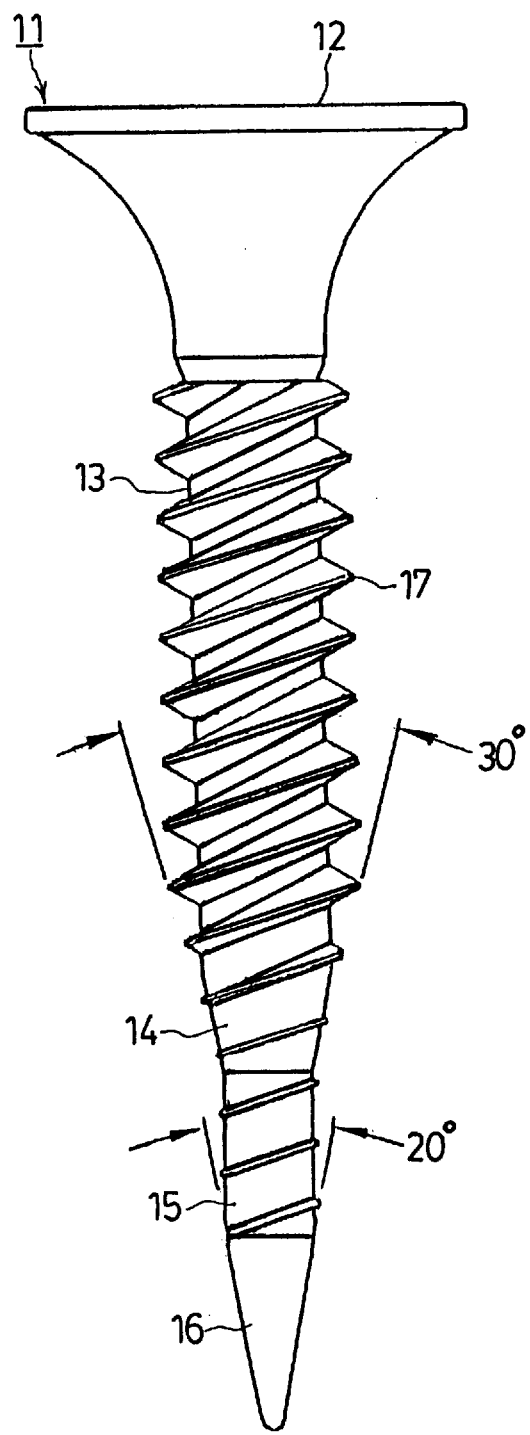
FIG. 1 is a plan view of the drilling screw of the present invention.

1 C-type steel plate structural material
2, 3 gypsum board
11 drilling screw
12 trumpet head
13 parallel thread part
14 taper thread part
15 smaller diameter parallel thread part
16 taper bit
17 double start thread crest

Description of the Preferred Embodiments

Now, embodiments of the present invention are explained closely referring to the drawings. As shown in FIG. 1, the drilling screw 11 has the trumpet head 12. The parallel thread part 13 has, at its top, the trumpet head 12 provided with cross socket or hexagon socket. Then, the lower part of the parallel thread part 13 is connected to the smaller diameter parallel thread part 15 through the taper thread part 14. The conical shaped taper bit 16 is formed at the fore end of the smaller diameter parallel thread part 15. The taper bit 16 is so sharp that its taper angle is as small as 20° in order to decrease the resistance against its inserting through the thin steel plate.

The dimension of the drilling screw 11 in the same figure is as follows; its whole length is 25 mm, the outer diameter of trumpet head 12 is 8 mm, the outer diameter of parallel thread part 13 is 3.55 mm, and the outer diameter of smaller diameter parallel thread part 15 is 1.8 mm.

The double start thread crest 17 passes from the parallel thread part 13 through the taper thread part 14 to the smaller diameter parallel thread part 15, and is provided at the taper thread part 14 so as to have the taper angle of 30° between the crest and the parallel thread part 13 and between the crest and the smaller diameter parallel thread part 14. Then, the height of double start thread crest 17 is decreased to be as small as about 0.1 mm at the smaller diameter parallel thread part 15 so that driving force can be generated during rotation of hammered screw as well as that the resistance against its inserting through the thin steel plate can be restrained as much as possible.

Figure 2:
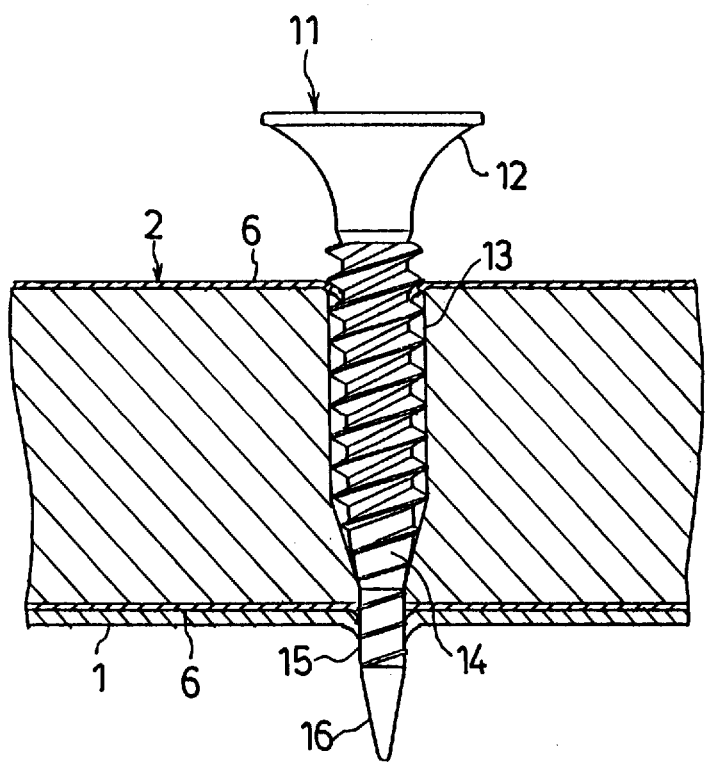
FIG. 2 is a view explaining the drilling screw of FIG. 1 fastened to a gypsum board and a C-type thin steel plate with an impact-type air driven screw fastener, and a cross section showing the condition of hammered drilling screw.

When the drilling screw 11 is loaded in an impact type air driven screw fastener for screw fixing the gypsum board having the thickness of 9.5 mm or 12.5 mm to the C-type steel plate structural material, as shown in FIG. 2, the drilling screw is hammered into the gypsum board 2 with the driver of the screw fastener (not shown) so that the taper bit 16 makes a hole in the C-type steel plate structural material 1. Then, such hammering is stopped when the smaller diameter parallel thread part 15 is inserted through the C-type steel plate structural material 1.

Continuously, the drilling screw 11 is rotated with the driver so that driving force in the inserting direction is generated due to the small-sized thread crest provided at the smaller diameter parallel thread part 15 which is fitted into the C-type steel plate structural material 1 and tapping is carried out while the hole is enlarged by the taper thread part 14.

Figure 3:
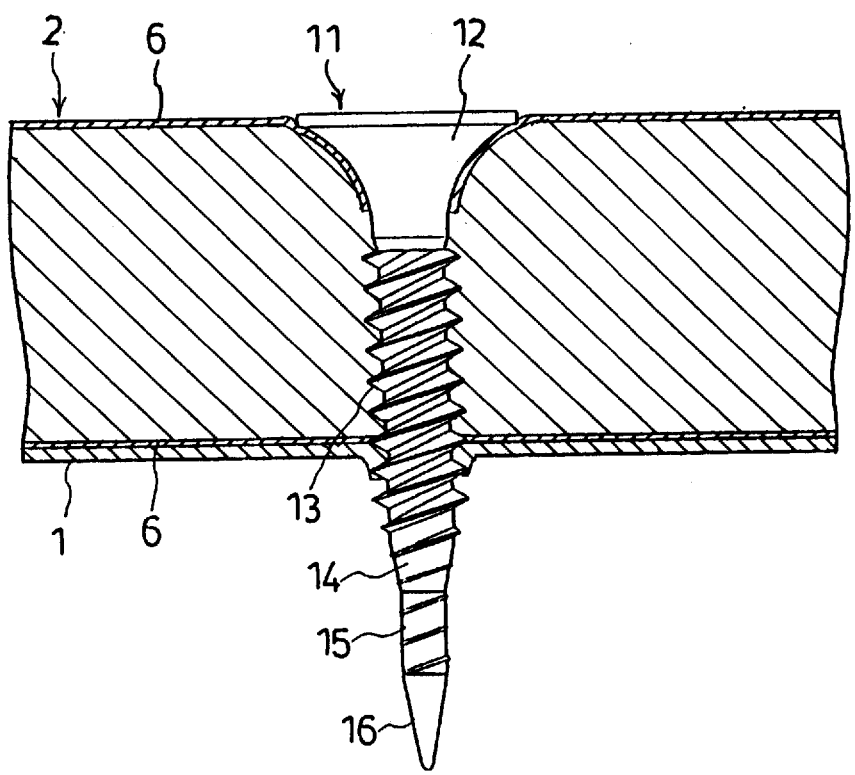
FIG. 3 is a cross section showing the condition of fastened drilling screw upon rotation after the condition of FIG. 2.

Then, the resistance against the driving of the screw is increased by inserting of parallel thread part 13 through the C-type steel plate structural material 1 and putting of the trumpet head 12 into the gypsum board 1. As shown in FIG. 3, the top level of the trumpet head 12 substantially coincides with the surface level of the gypsum board 2, the rotation is stopped.

Figure 4:
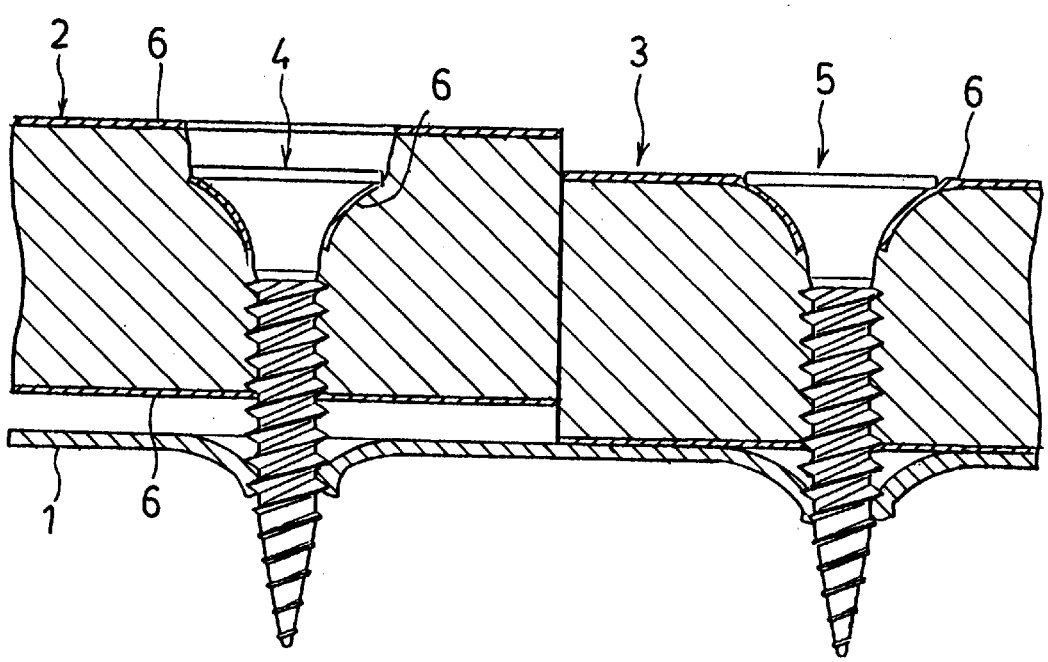
FIG. 4 is a view explaining the conventional drilling screws fastened to gypsum boards and a C-type thin steel plate with an impact-type air driven screw fastener, and a cross section showing that the coated paper of the gypsum board is damaged.
Figure 5:
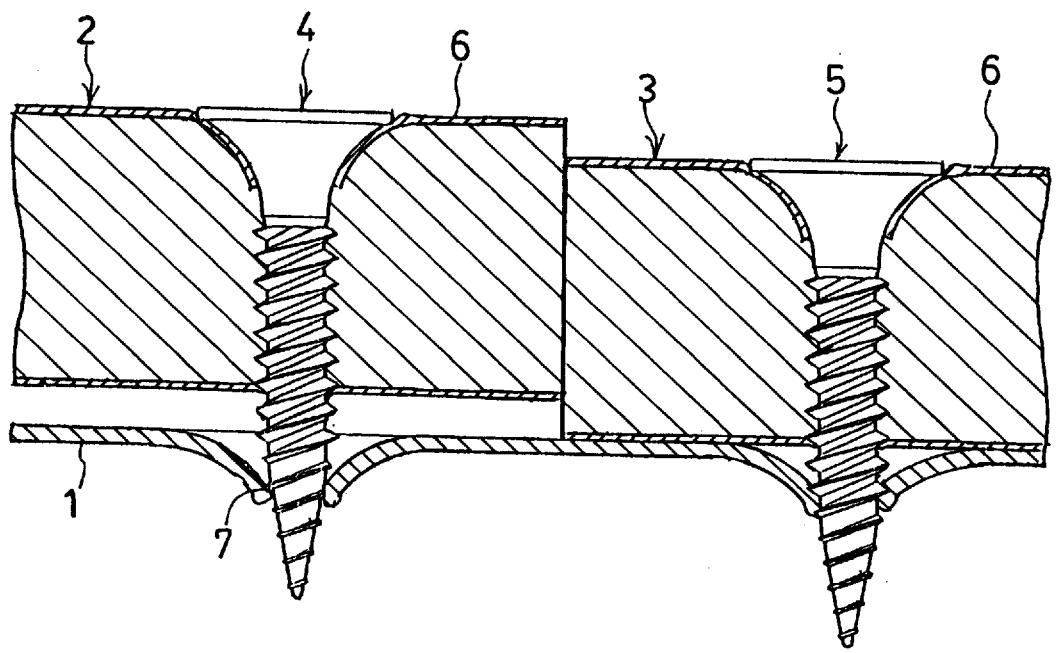
FIGS. 5 is a view explaining the conventional drilling screws fastened to gypsum boards and a C-type thin steel plate with an impact-type air driven screw fastener, and a cross section of steel plate showing the damage of the steel plate's part into which the screw is fitted.

Experiments were performed in the similar conditions to those of FIGS. 4 and 5 explained as the conventional examples by utilizing two sheets of gypsum board located so as to butt each other on the C-type steel plate structural material 1 and the drilling screws 11 were fastened to the gypsum boards, respectively. The results of these experiments are shown in Table 1.

TABLE 1

|  | loose torque attenuation (kgf. cm) | minimum loose torque (kgf. cm) | braking of coating paper | un-fitting of screw |
| --- | --- | --- | --- | --- |
| motor driver | 0 (no impact) | 3 | not occurred | not occurred |
| conventional drilling screw | 2.2 to 4.1 | 0 (fitted portion is broken) | occurred | occurred |
| drilling screw of the invention | equal to or smaller than 1.4 | equal to or larger than 5.0 | not occurred | not occurred |

Since the taper bit 14 of the drilling screw 11 was so sharp and the diameter of the smaller diameter parallel thread part 15 was as small as 1.8 mm, the C-type steel plate structural material 1 almost kept its shape during hammering. Accordingly, the drilling screw fastened previously was seldom buried into the gypsum board 2. Further, neither breaking of the released paper 6 nor un-fitting of the screw was occurred. The loose torque attenuation of the drilling screw 11 hammered previously was equal to or smaller than 1.4 kgf. cm, which was quite smaller than that of conventional drilling screw. Additionally, the obtained loose torque indicating the loose strength is equal to or larger than 5.0 kgf. cm, which was larger than that of conventional method where the screw was not hammered and fastened with the motor driver.

In another experiment, the drilling screw 11, whose smaller diameter parallel thread part's outer diameter was increased to be 2.1 mm, was fastened with the impact-type air driven screw fastener. In the conventional method where the screw was fastened with the motor driver, the loose torque was 3.0 kgf. cm. However, from the result of this experiment, the obtained loose torque was smaller than 3.0 kgf. cm. Therefore, in order to sustain impact upon hammering, it is effective that the screw is formed so that the outer diameter of the smaller diameter parallel thread part 15 is equal to or smaller than 1.8 mm for the C-type steel plate structural material having the thickness of 0.5 mm or 0.8 mm.

As explained closely in the foregoing, since the drilling screw of the present invention decreases the deformation of the steel plate and vibration as much as possible, the load strength and fastening power, which would be decreased by impact upon hammering of the screw into the gypsum board and C-type steel plate and the like, are prevented from being decreased. Accordingly, screw fastening can be carried out with the impact-type air driven screw fastener. Additionally, comparing with the conventional execution method with the screw driver, removing strength is increased, further, since the rotation number of screw during execution is small, the amount of dispersed gypsum powder is decreased, resulting in high efficiency in fastening.

What is claimed is:
1. A drilling screw comprising:
   a trumpet head;
   a first parallel thread part having a first diameter and a first longitudinal length attached to said trumpet head;
   a first thread crest formed on said first parallel thread part;
   a taper thread part attached to said parallel thread part, said taper thread part having a first taper angle of substantially thirty degrees;
   a second parallel thread part having a second diameter attached to said taper thread part and a second longitudinal length, the first diameter of said first parallel thread part being approximately twice the second diameter of said second parallel thread part, and the first longitudinal length being substantially longer than the second longitudinal length;
   a second thread crest formed on said second parallel thread part, the second thread crest being decreased from the first thread crest;
   a taper thread crest on said taper thread part extending between said first parallel thread part and said second parallel thread part, said taper thread crest decreasing in height from said first parallel thread part to said second parallel thread part; and an unthreaded taper bit having a second taper angle of substantially twenty degrees attached to the second parallel thread part and having a maximum diameter substantially equal to the second diameter of said second parallel thread part, whereby the drilling screw is adapted to attach a gypsum board to a thin steel plate with reduced force and damage.

2. A drilling screw as in claim 1 wherein:

the first diameter of said first parallel thread part is substantially 3.55 mm; and the second diameter of said second parallel thread part is substantially 1.8 mm.

3. A drilling screw used in attaching a gypsum board to a thin C-type steel plate comprising:

a trumpet head;

a first parallel thread part having a first diameter and a first longitudinal length attached to said trumpet head;

a first thread crest formed on said first parallel thread part;

a taper thread part attached to said parallel thread part, said taper thread part having a first taper angle of substantially thirty degrees;

a second parallel thread part having a second diameter attached to said taper thread part and a second longitudinal length, the first diameter of said first parallel thread part being approximately twice the second diameter of said second parallel thread part, and the first longitudinal length being substantially longer than the second longitudinal length;

a second thread crest formed on said second parallel thread part, the second thread crest being decreased from the first thread crest and having a height of about 0.1 mm;

a taper thread crest on said taper thread part extending between said first parallel thread part and said second parallel thread part, said taper thread crest decreasing in height from said first parallel thread part to said second parallel thread part;

an unthreaded taper bit having a second taper angle of substantially twenty degrees attached to the second parallel thread part and having a maximum diameter substantially equal to the second diameter of said second parallel thread part;

a gypsum board having a thickness between 9.5 mm and 12.5 mm, and a C-type steel plate structural material having a thickness between 0.5 mm and 0.8 mm placed adjacent said gypsum board, whereby the drilling screw is adapted to attach said gypsum board to said C-type steel plate structural material with reduced force and damage by said unthreaded taper bit piercing said C-type steel plate permitting said second thread crest to assist in threading the drilling screw into said C-type steel plate.

* * * * *